(12) United States Patent
Booth et al.

(10) Patent No.: US 8,083,878 B1
(45) Date of Patent: Dec. 27, 2011

(54) FIRE RESISTANT VENEER ASSEMBLY FOR AIRCRAFT INTERIORS

(75) Inventors: Carl F. Booth, Sellersburg, IN (US); David L. Isaacs, New Albany, IN (US); Jason London, Floyd's Knobs, IN (US); William L. Wolfe, Elizabeth, IN (US)

(73) Assignee: Goodrich Corporation, Charlotte, NC (US)

( * ) Notice: Subject to any disclaimer, the term of this patent is extended or adjusted under 35 U.S.C. 154(b) by 1112 days.

(21) Appl. No.: 11/973,686

(22) Filed: Oct. 10, 2007

Related U.S. Application Data

(60) Provisional application No. 60/850,515, filed on Oct. 10, 2006.

(51) Int. Cl.
*B32B 37/00* (2006.01)
(52) U.S. Cl. .................................... 156/153; 156/154
(58) Field of Classification Search .................. 156/154, 156/153
See application file for complete search history.

(56) References Cited

U.S. PATENT DOCUMENTS

| | | | | |
|---|---|---|---|---|
| 2,699,417 A | * | 1/1955 | Repsher et al. | 428/292.7 |
| 2,765,598 A | * | 10/1956 | Judd | 451/59 |
| 3,125,461 A | * | 3/1964 | Hoffmann | 427/289 |
| 4,293,603 A | | 10/1981 | Hayman-Chaffey et al. | |
| 4,767,667 A | | 8/1988 | Schneider et al. | |
| 5,089,291 A | | 2/1992 | Hayama et al. | |
| 5,380,379 A | * | 1/1995 | Maiwald et al. | 148/697 |
| 5,413,840 A | | 5/1995 | Mizuno | |
| 5,492,589 A | | 2/1996 | Mizuno | |
| 6,242,055 B1 | | 6/2001 | Neumann et al. | |
| 2004/0247902 A1 | | 12/2004 | Chuang | |
| 2005/0286246 A1 | * | 12/2005 | Coon et al. | 362/235 |

FOREIGN PATENT DOCUMENTS

| | | | |
|---|---|---|---|
| JP | 06-93396 A | * | 4/1994 |
| JP | 06-93397 A | * | 4/1994 |
| JP | 06-101003 A | * | 4/1994 |
| JP | 06-101004 A | * | 4/1994 |
| JP | 10-175274 A | * | 6/1998 |

OTHER PUBLICATIONS

Machine translation of Japanese Patent 10-175274, date unknown.*

* cited by examiner

*Primary Examiner* — Jeff Aftergut
(74) *Attorney, Agent, or Firm* — Jerry J. Holden; John D. Titus

(57) ABSTRACT

A fire resistant wood veneer assembly includes at least a decorative veneer layer and at least one aluminum foil layer. The aluminum foil layer is bonded to the decorative wood veneer with phenolic adhesive at high pressure and high temperature to produce a fire resistant veneer assembly. A additional non-decorative veneer layer may also be bonded to the aluminum foil layer and the resulting veneer assembly may be precision belt sanded on the non-decorative side to produce a flat decorative fire resistant veneer assembly.

10 Claims, 17 Drawing Sheets

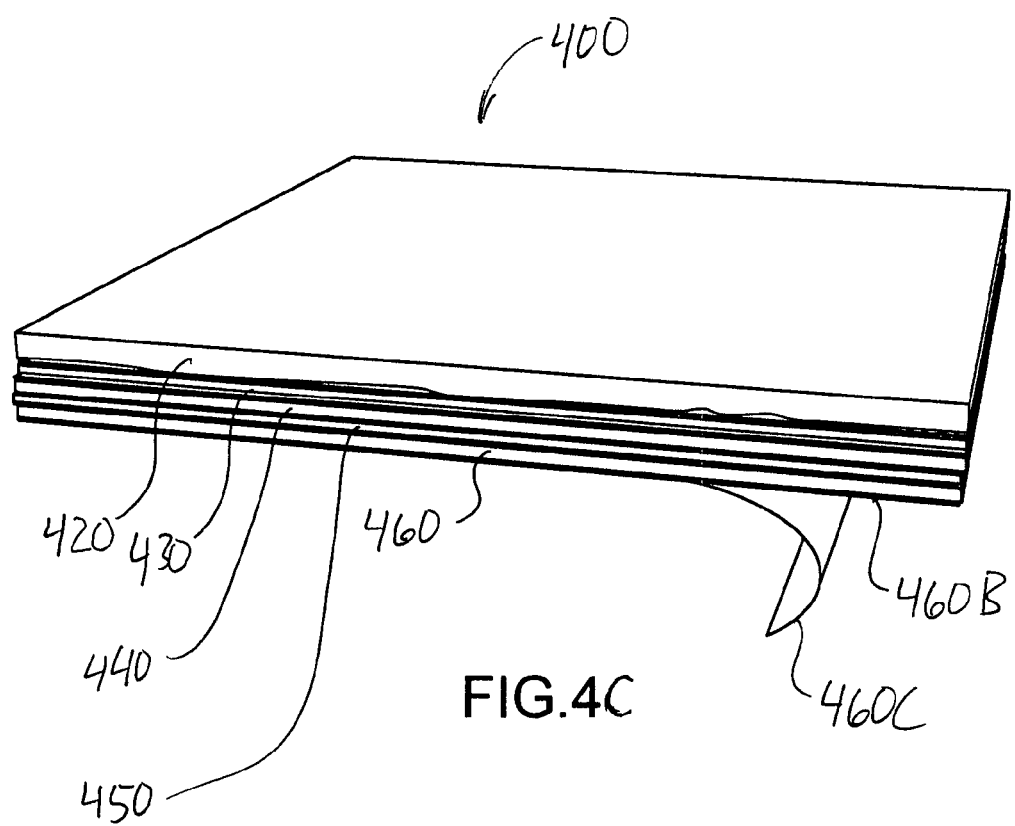

FIRE RESISTANT VENEER ASSEMBLY FOR AIRCRAFT INTERIORS

CROSS REFERENCES TO RELATED APPLICATIONS

This application claims the benefit of U.S. Provisional Patent Application No. 60/850,515 filed Oct. 10, 2006.

FIELD OF THE INVENTION

This invention relates to fire resistant laminated natural wood veneer assemblies for aircraft interiors and methods for making such veneer assemblies.

BACKGROUND OF THE INVENTION

Part 25 of Title 14 of the Code of Federal Regulations sets forth a stringent Federal Aviation Administration (FAA) vertical flammability test for materials proposed for aircraft interiors. More particularly, the standards for flammability tests, heat release rate tests and smoke emission tests for proposed aircraft cabin materials are very stringent for aircraft capable of carrying 20 or more passengers. In the past, such test standards have impeded the use of natural wood veneers in aircraft for carrying fewer than 20 passengers and have generally precluded the use of such natural wood veneers in aircraft carrying more than 20 passengers. One solution, for aircraft carrying fewer than 20 passengers has been the application of fire retardant chemicals to wood veneers. But in many cases, fire retardant chemicals cause discoloration of a decorative wood veneer. What is needed is a veneer assembly which does not require the use of fire retardant chemicals and which is inherently fire resistant.

SUMMARY OF THE INVENTION

A first embodiment of the present invention provides an inherently fire resistant 2-ply veneer assembly. The first embodiment veneer assembly generally includes a decorative wood veneer and an aluminum foil backing bonded together in a laminated veneer assembly. In this specification the term "veneer" should be understood by the skilled reader as a being a thin sheet of wood veneer which may be described below as decorative or non-decorative. A veneer assembly should be understood as a laminate including at least one layer of wood veneer.

The method for making a first embodiment of a fire resistant veneer assembly includes laying up a decorative wood veneer and an aluminum foil backing with a thin film of phenolic adhesive between decorative wood veneers and the aluminum foil. The lay up is then pressed preferably at a pressure between 150 psi and 250 psi and at a temperature between 275 degrees F. and 325 degrees F. for four to six minutes. It is preferable that after the assembly is pressed under high pressure and temperature, the assembly is precision sanded using wide belt sanders.

The surface of the decorative veneer may be flattened by precision belt sanding. When sanding of the surface of the decorative veneer, special care should be taken to limit, as much as possible, the amount of decorative veneer removed by sanding. In some applications, a 2-ply embodiment having only an aluminum foil backing is advantageous where weight may be a concern and for easily forming the laminated veneer assembly to a contour. Also in some applications, having an aluminum foil backing is advantageous for bonding with specific adhesive(s) to various substrates such as honeycomb core. A pressure sensitive adhesive (PSA) may be added to the aluminum foil backing for bonding to various panels and other substrates.

In a second three ply embodiment of the invention, a non-decorative layer may be bonded to the back of the aluminum foil layer by means of a second thin film of phenolic adhesive in a bonding process substantially like the high pressure, high temperature process described above. The bonding of the non-decorative layer is preferably conducted in the same bonding operation as the bonding the decorative wood veneer and the aluminum foil backing. It is preferable that after the three ply assembly is pressed under high pressure and temperature, the assembly is precision sanded using wide belt sanders. The non-decorative veneer backing is initially precision sanded in order to flatten the veneer assembly. The decorative veneer surface may also be sanded while taking care to limit the amount of decorative veneer removed by sanding. In some applications, having a non-decorative wood backing is advantageous for bonding with specific adhesive (s) to various substrates such as honeycomb core. A pressure sensitive adhesive (PSA) may be added to the non-decorative veneer for bonding to various panels and other substrates.

In a third 4-ply embodiment of the invention, a second aluminum foil layer may be bonded to the back of the non-decorative wood veneer described above by a second phenolic bonding process substantially like the high pressure, high temperature process described above. The bonding of the second aluminum foil layer should preferably occur after the above-described wide belt sanding of the non-decorative layer operations and before sanding the decorative veneer surface. The decorative veneer surface may also be sanded after the second phenolic bonding process. Care should be taken to limit, by as much as possible, the amount of decorative veneer removed by sanding. In some applications, having an aluminum foil backing is advantageous for bonding with specific adhesive(s) to various substrates such as honeycomb core. A pressure sensitive adhesive (PSA) may be added to the second aluminum foil layer for bonding to various panels and other substrates.

In a five ply fourth embodiment of the invention, a second aluminum foil layer and a second non-decorative wood veneer layer may be bonded to the back of the decorative wood veneer layer. It is preferable that after the assembly is pressed under high pressure and temperature, the assembly is precision sanded using wide belt sanders. The second non-decorative veneer backing is initially precision sanded in order to flatten the veneer assembly. The decorative veneer surface may also be sanded while taking care to limit the amount of decorative veneer removed by sanding. This 5-ply embodiment provides a less flexible veneer assembly but also offers added strength. In some applications, having a non-decorative wood veneer backing may be advantageous for bonding with a specific adhesive or specific adhesives to various substrates such as honeycomb core. A pressure sensitive adhesive (PSA) may be added to the second non-decorative veneer layer for bonding to various panels and other substrates.

BRIEF DESCRIPTION OF THE DRAWINGS

FIG. 4C is a cross-section diagram illustrating the fourth veneer assembly embodiment with an added layer of pressure sensitive adhesive including a release paper.

DETAILED DESCRIPTION

Figure 1:
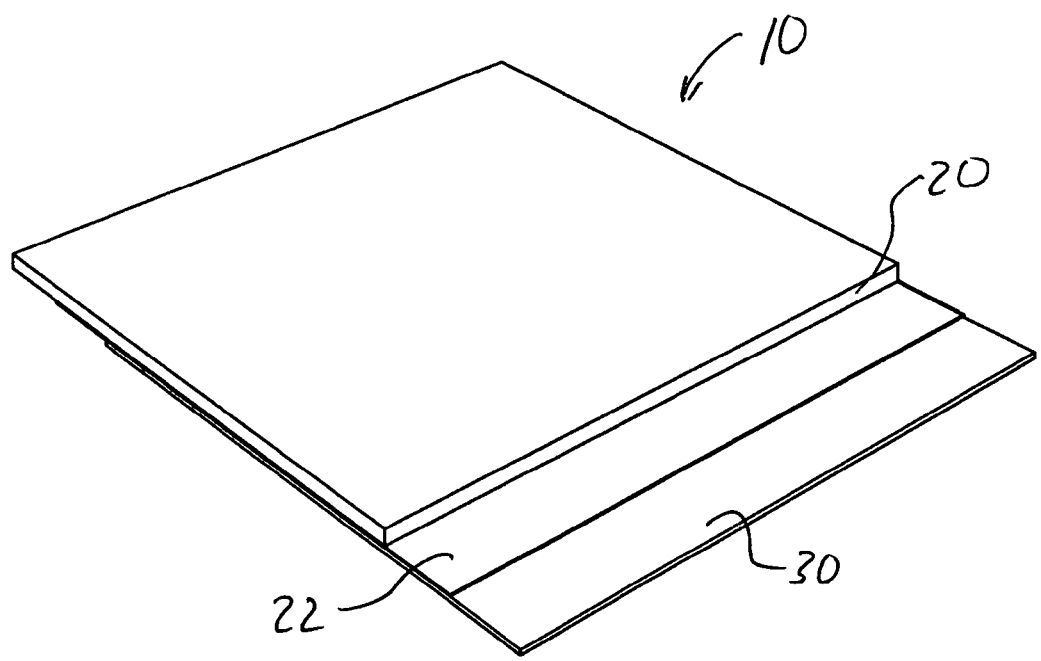
FIG. 1 is a perspective cross-section diagram illustrating a first veneer assembly embodiment.

Referring to FIG. 1, an example, fire resistant 2-ply veneer assembly 10 for aircraft interiors is shown including a decorative wood veneer layer 20, a layer of phenolic adhesive 22 and an aluminum foil backing 30. The veneer structure 10 shown in FIG. 1 may be considered as a lay up which is first arranged and then pressed at elevated temperature to produce a bonded laminated structure. In FIG. 1, the edges of each layer are shown recessed within the underlying layer for ease of illustration. As can be seen in FIG. 1, a thin film of phenolic adhesive 22 is interposed between decorative wood veneer layer 20 and aluminum foil layer 30. Decorative wood veneer layer 20 may be fashioned from any one of a multitude of decorative woods. Phenolic adhesive is activated by high pressure and high temperature. Thus, the lay up shown in FIG. 1 is preferably pressed at a pressure between 150 psi and 250 psi and at a temperature between 275 degrees F. and 325 degrees F. for four to six minutes. This high pressure, high temperature pressing operation activates the phenolic adhesive and results in a permanently bonded veneer assembly. The pressing operation is illustrated in FIG. 9. FIG. 9 is a diagram illustrating that veneer assembly 10 is pressed between two tools A and B with heat and pressure. Accordingly at least one of tools A or B is heated. It may also be advantageous for veneer assembly 10 to use aluminum foil fashioned from a heat treated aluminum. Heat treated aluminum does not yield as easily as annealed aluminum. When aluminum layer 30 is fashioned from heat treated aluminum, aluminum layer 30 if sufficiently thin may be easily formed as the finished veneer assembly is formed around curved structures. The advantage with heat treated aluminum is that when formed, the heat treated aluminum will not conform to every small order variation which may arise as the grain of the decorative veneer is formed around bends and contours. Accordingly, when a heat treated aluminum layer 30 is used, decorative curved or contoured surfaces may tend to have a smoother appearance. In the above and in the embodiments described below, the skilled reader may consider the use of heat treated alunimum foils—especially were the resulting veneer assembly will be used in curved or contoured applications.

Figure 1A:
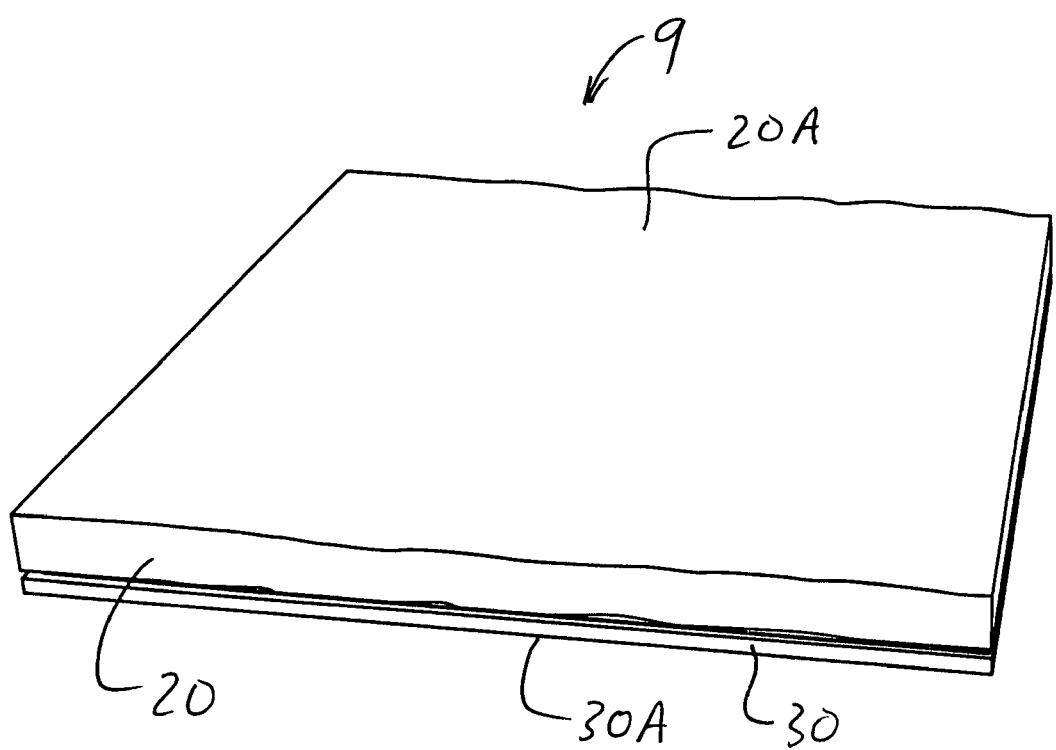
FIG. 1A is a cross-section diagram illustrating the first veneer assembly embodiment before wide belt sanding.
Figure 1B:
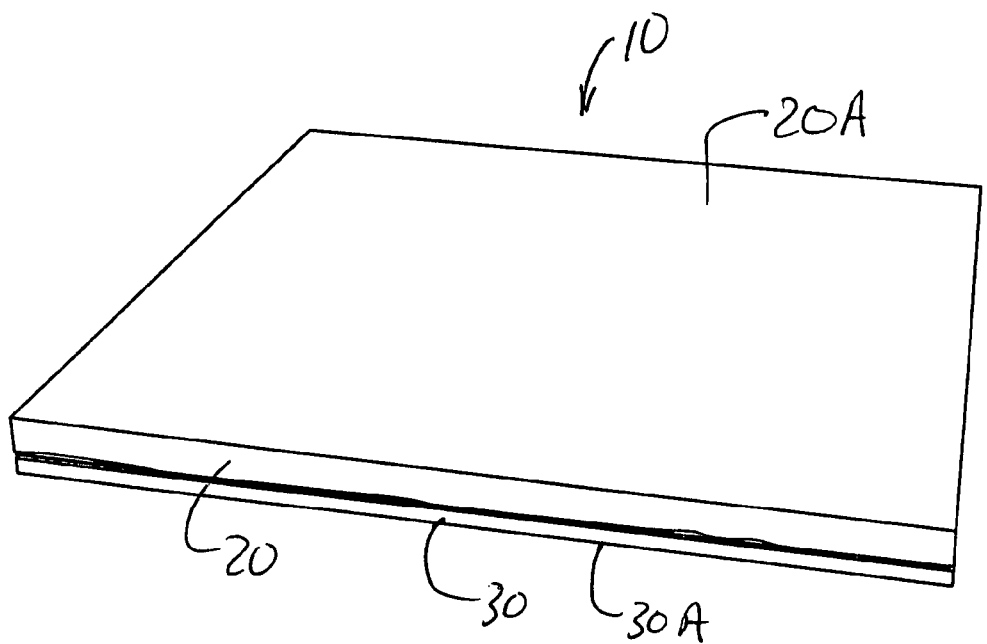
FIG. 1B is a cross-section diagram illustrating the first veneer assembly embodiment after wide belt sanding.

FIG. 1A illustrates veneer assembly 9, which indicates a veneer assembly, which is not completed. Veneer assembly 9 has not been processed through a wide belt sanding operation. As is shown in FIG. 1A, decorative veneer layer 20 of un-sanded veneer assembly 9 typically has residue from the manufacturing process and slight variations in thickness. Precision wide belt sanding is well known in the art. The purpose of the precision wide belt sanding operation is to remove any residue from the manufacturing process and flatten outer surface 20A of decorative veneer layer 20 in order to produce a finished veneer assembly having a substantially uniform thickness. In the precision wide belt sanding operation, outer surface 30A of aluminum foil layer 30 is pressed against a feed belt and platen while multi wide belt sanding heads remove material from outer surface 20A of decorative veneer layer 20. Thus any residue from the manufacturing process and the variations in thickness in veneer layer 20 are largely eliminated by removing material from decorative layer 20 as shown in FIG. 1B.

Figure 1C:
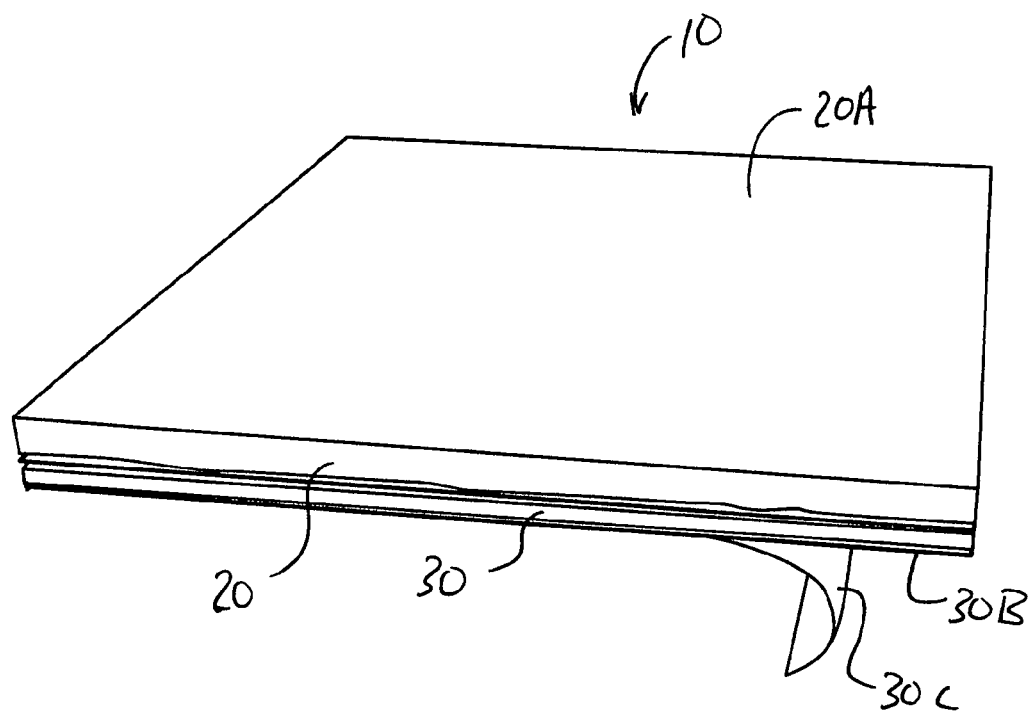
FIG. 1C is a cross-section diagram illustrating the first veneer assembly embodiment with an added layer of pressure sensitive adhesive including a release paper.

FIG. 1C shows veneer assembly 10 with an additional layer of pressure sensitive adhesive (PSA) 30B. Typically, PSA includes a release paper (30C), which can be peeled away prior to placement on a substrate surface.

Figure 2:
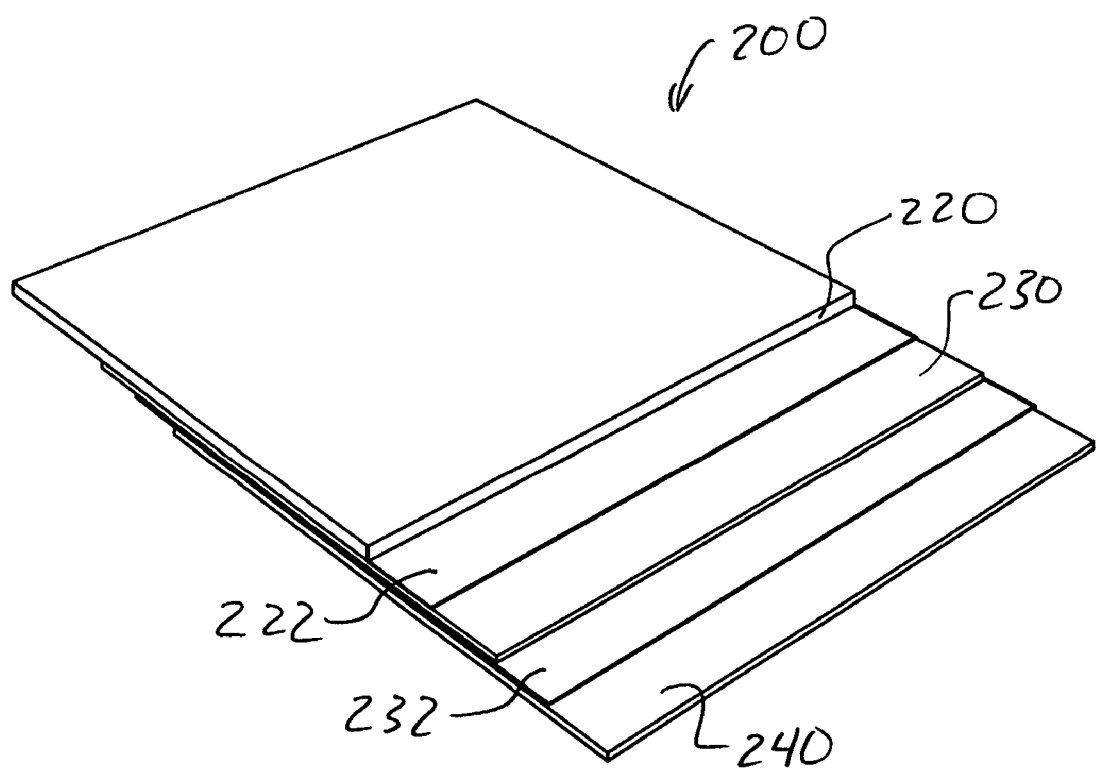
FIG. 2 is a perspective cross-section diagram illustrating a second veneer assembly embodiment.

Referring to FIG. 2, an example, fire resistant 3-ply veneer assembly 200 for aircraft interiors is shown including a decorative wood veneer layer 220, an aluminum foil layer 230 and a non-decorative veneer backing 240. The veneer structure 200 shown in FIG. 2 may be considered as a lay up which is first arranged and then pressed at elevated temperature to produce a bonded laminated structure. In FIG. 2, the edges of each layer are shown recessed within the underlying layer for ease of illustration. As can be seen in FIG. 2, thin films of phenolic adhesive 222 and 232 are interposed between decorative wood veneer layer 20 and aluminum foil layer 230 and between aluminum foil layer 230 and non-decorative wood veneer layer 240. Decorative wood veneer layer 220 may be fashioned from any one of a multitude of decorative woods. Non-decorative wood veneer layer 240 is preferably fashioned from poplar. As described above, a phenolic adhesive is activated by high pressure and high temperature. Thus, the lay up shown in FIG. 2 is preferably pressed at a pressure between 150 psi and 250 psi and at a temperature between 275 degrees F. and 325 degrees F. for four to six minutes. This high pressure, high temperature pressing operation activates the phenolic adhesive and results in a permanently bonded veneer assembly.

Figure 2A:
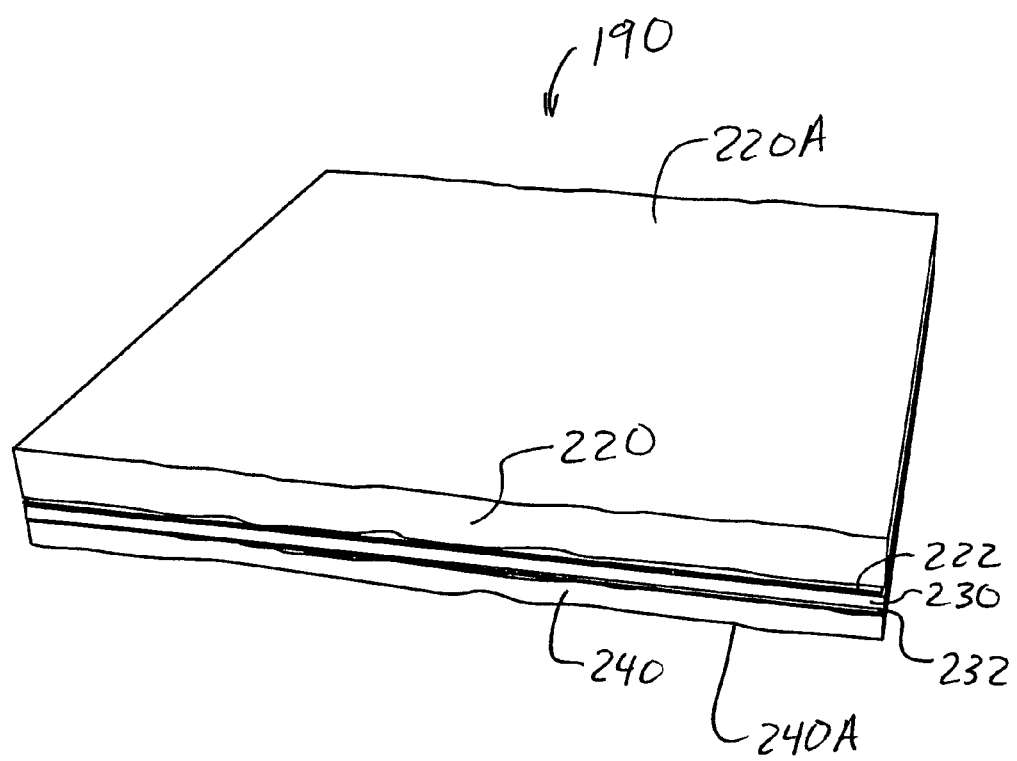
FIG. 2A is a cross-section diagram illustrating the second veneer assembly embodiment before wide belt sanding.
Figure 2B:
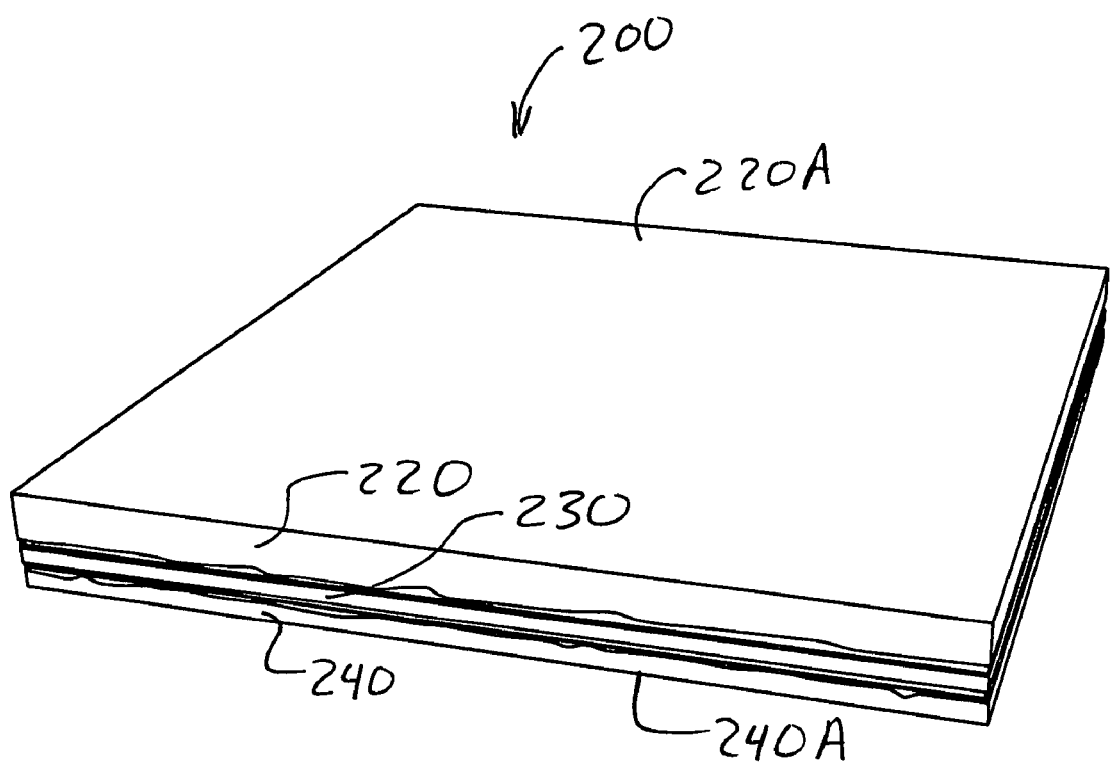
FIG. 2B is a cross-section diagram illustrating the second veneer assembly embodiment after wide belt sanding.
Figure 2C:
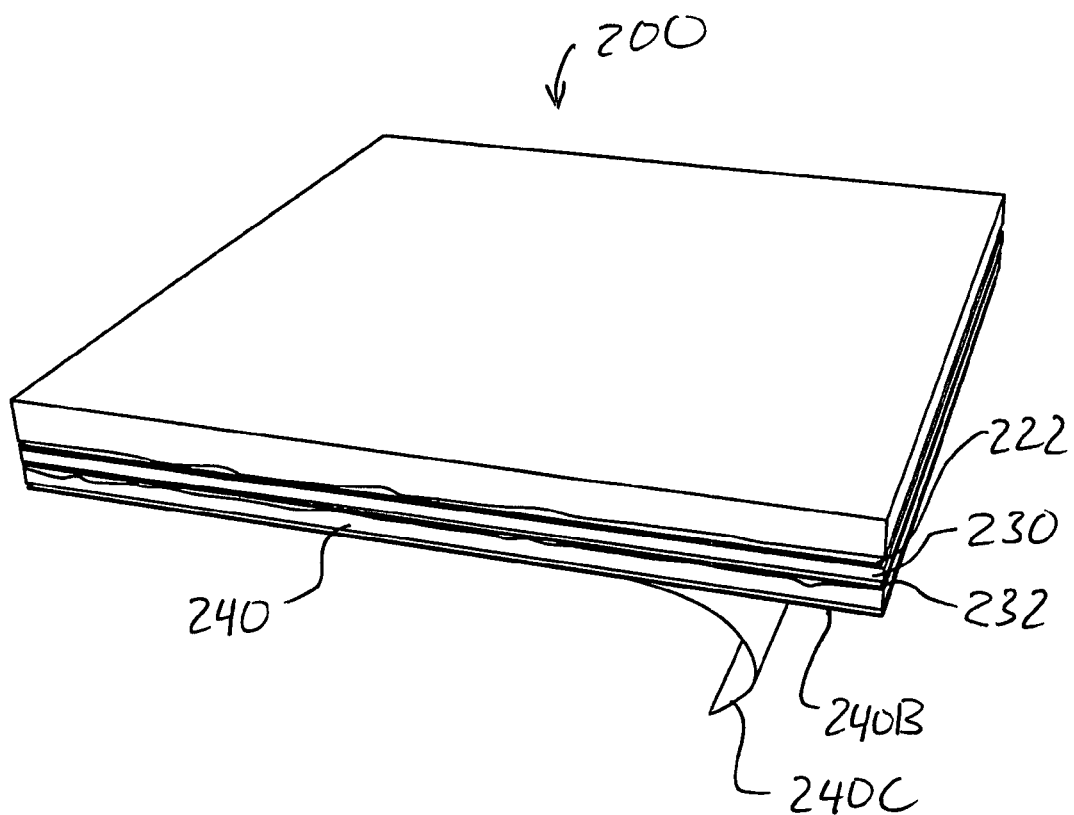
FIG. 2C is a cross-section diagram illustrating the second veneer assembly embodiment with an added layer of pressure sensitive adhesive including a release paper.
Figure 6:
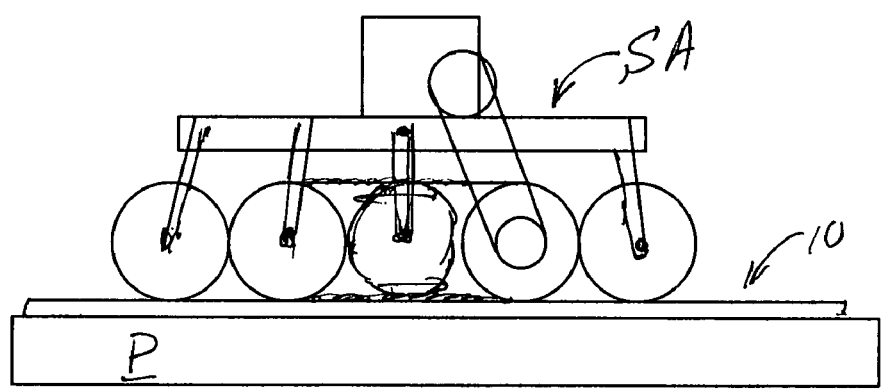
FIG. 6 is a diagram of a set up for precision belt sanding a veneer assembly.

FIG. 2A illustrates veneer assembly 190, which indicates a veneer assembly, which is not completed. Veneer assembly 190 has not been processed through a wide belt sanding operation. As is shown in FIG. 2A, decorative veneer layer 220 of un-sanded veneer assembly 190 typically has residue from the manufacturing process and slight variations in thickness. The same is the case for non-decorative veneer layer 240. Precision wide belt sanding is well known in the art. A precision belt sanding operation is generally illustrated in FIG. 6. FIG. 6 is a diagram showing a veneer assembly 10 arranged on flat platen P being precision belt sanded by precision wide belt sander SA. The purpose of the precision wide belt sanding operation is flatten the outer surface 240A of non-decorative veneer layer 240 in order to produce a finished veneer assembly having a substantially uniform thickness. In this precision wide belt sanding operation, outer surface 220A of decorative veneer 220 is pressed against a feed belt and platen while multi wide belt sanding heads removes material from outer surface 240A of non-decorative veneer layer 240. Thus the variations in thickness in veneer layers 220 and 240 are largely eliminated by removing material from non-decorative veneer layer 240 as shown in FIG. 2B. A completed, wide belt sanded veneer assembly 200 is shown in FIG. 2B. In FIG. 2B, decorative veneer 220 may also be sanded to remove any residue from the manufacturing process and flatten the outer surface 220A of decorative veneer layer 220 in a wide belt sanding operation—but only very slightly in order to preserve as much of the thickness of decorative veneer layer 220 as possible. In FIG. 2B, the resulting sanded assembly may have internal variations but will present a substantially flat decorative veneer surface 220A. Close inspection of FIG. 2B reveals that the outside surface of decorative veneer layer 220, namely surface 220A is generally flat. Further, in FIG. 2B, aluminum foil layer 230 now undulates in a way that corresponds to the initial variation of decorative veneer layer 220 shown in FIG. 2A. In FIG. 2B, non-decorative veneer layer 240 varies in thickness and the outside surface 240A of non-decorative veneer layer 240 is generally flat. In effect, material has been removed from non-decorative veneer layer 240 to compensate for the variations in thickness originally present in the veneers. Accordingly, if the wide belt sanded veneer assembly 200 shown in FIG. 2B is mounted to a flat substrate surface, outside surface 220A of decorative veneer layer 220 will present a surface that is sufficiently flat and smooth for a high quality aircraft interior finish. FIG. 2C shows veneer assembly 200. Non-decorative veneer layer 240 may include an optional layer of pressure sensitive adhesive (PSA) 240B. Typically, PSA includes a release paper (40C), which can be peeled away prior to placement on a substrate surface.

Figure 3:
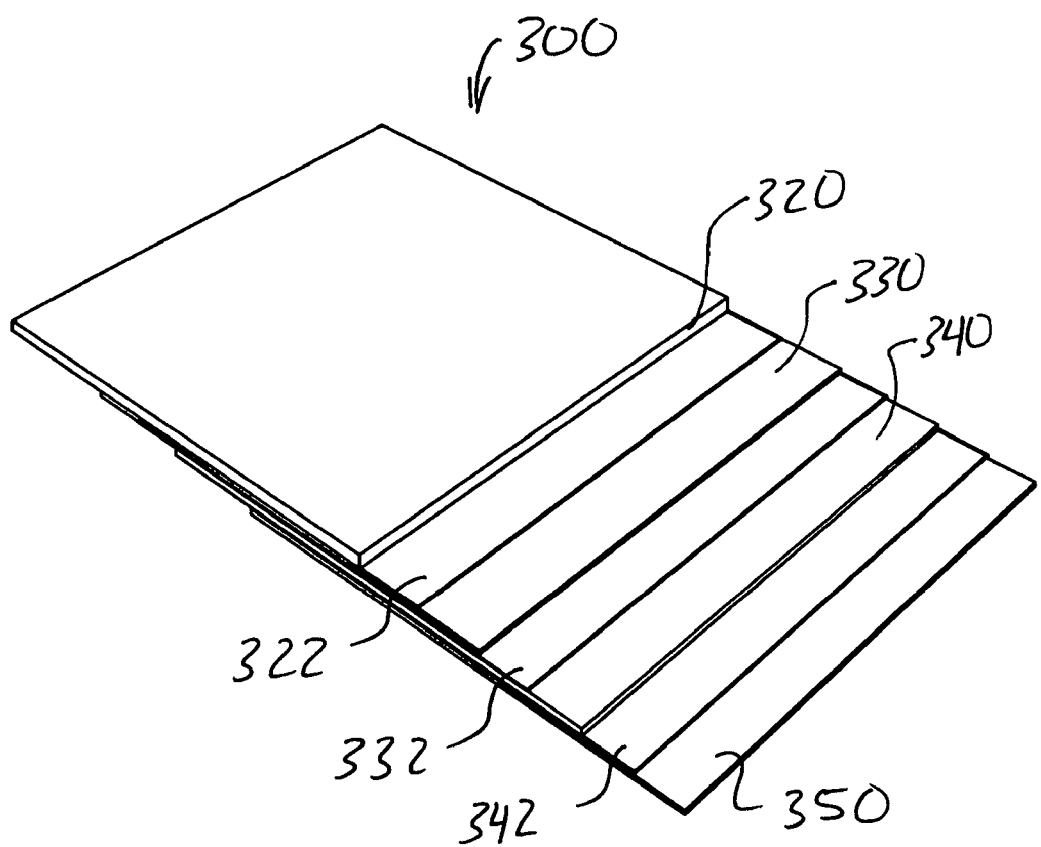
FIG. 3 is a perspective cross-section diagram illustrating a third veneer assembly embodiment.

Referring to FIG. 3, an example fire resistant 4-ply veneer assembly 300 for aircraft interiors is shown including a decorative wood veneer layer 320, an aluminum foil layer 330, a non-decorative veneer layer 340 and an aluminum foil backing 350. The veneer structure 300 shown in FIG. 3 may be manufactured using two different manufacturing options.

The first option is as follows: The veneer structure 300 shown in FIG. 3 may be considered as a lay up, which is first arranged and then pressed at elevated temperature to produce a bonded laminated structure. In FIG. 3, the edges of each layer are shown recessed within the underlying layer for ease of illustration. As can be seen in FIG. 3, thin films of phenolic adhesive 322, 332 and 342 are interposed between decorative wood veneer layer 320 and aluminum foil layer 330, between aluminum foil layer 330 and non-decorative wood veneer layer 340 and between non-decorative wood veneer layer 340 and aluminum foil backing 350. Decorative wood veneer layer 320 may be fashioned from any one of a multitude of decorative woods. Non-decorative wood veneer layer 340 is preferably fashioned from poplar. Phenolic adhesive is activated by high pressure and high temperature. Thus, the lay up shown in FIG. 3 is preferably pressed at a pressure between 150 psi and 250 psi and at a temperature between 275 degrees F. and 325 degrees F. for four to six minutes. This high pressure, high temperature pressing operation activates the phenolic adhesive and results in a permanently bonded veneer assembly.

Figure 3A:
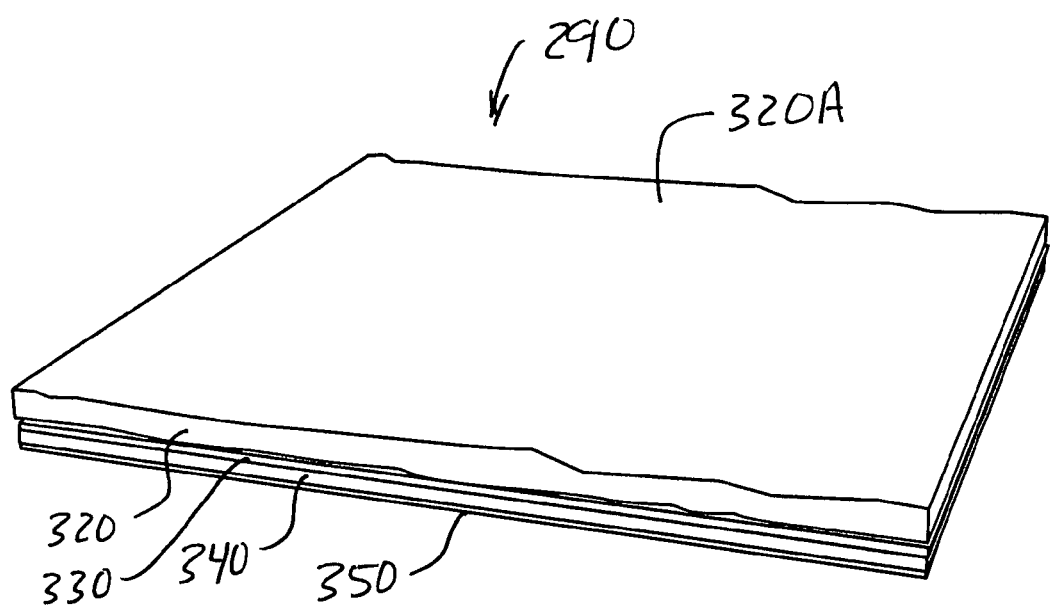
FIG. 3A is a cross-section diagram illustrating the third veneer assembly embodiment before wide belt sanding.

FIG. 3A illustrates veneer assembly 290, which indicates a veneer assembly, which is not completed. Veneer assembly 290 has not been processed through a wide belt sanding operation. As is shown in FIG. 3A, decorative veneer layer 320 of un-sanded veneer assembly 290 typically has residue from the manufacturing process and slight variations in thickness. The same is the case for non-decorative veneer layer 340. As described above, the residue from manufacturing may be removed in a precision belt sanding operation. Thus with precision belt sanding variations presented by outer surface 320A of decorative veneer layer 320 in order to produce a finished veneer assembly having a substantially uniform thickness. Outer surface 320A is chosen because it is the only veneer surface that is exposed for sanding. In the precision wide belt sanding operation, outer surface 350A, an aluminum foil surface, is pressed against a feed belt and platen while multi wide belt sanding heads remove material from outer surface 320A of decorative veneer layer 320. Thus the variations in thickness in veneer layers 320 and 340 are largely eliminated by removing material from non-decorative veneer layer 320 as shown in FIG. 3B.

Figure 3B:
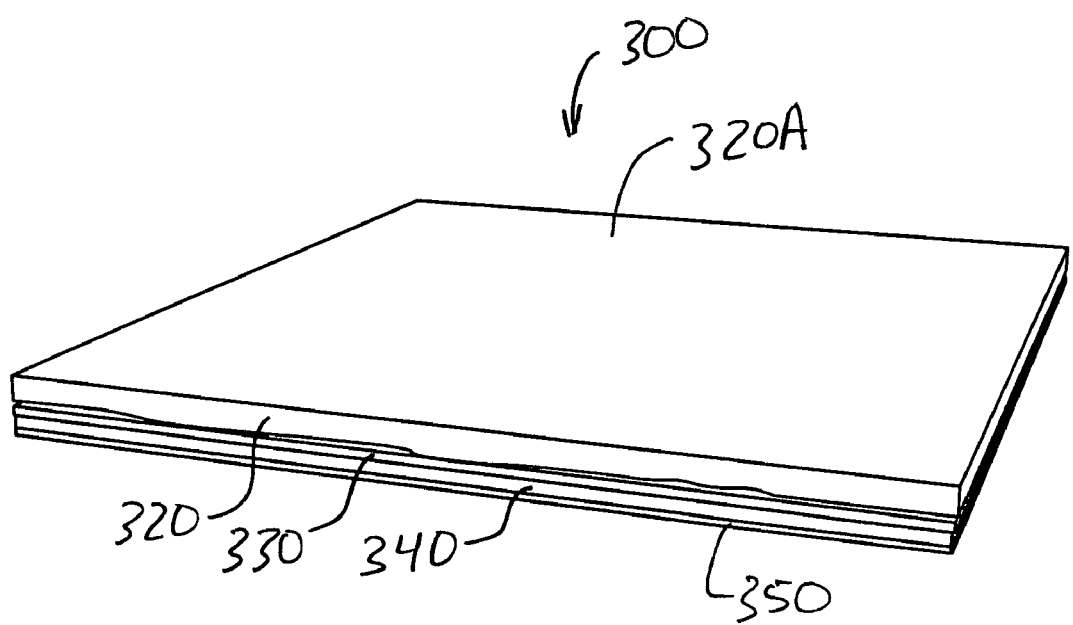
FIG. 3B is a cross-section diagram illustrating the third veneer assembly embodiment after wide belt sanding.

A completed, wide belt sanded veneer assembly 300 is shown in FIG. 3B. In FIG. 3B, decorative veneer surface 320A may also be sanded to remove any residue from the manufacturing process and flatten the outer surface 320A of decorative veneer layer 320 in a wide belt sanding operation—but only very slightly in order to preserve as much of the thickness of decorative veneer layer 320 as possible. As can be seen in FIG. 3B, the resulting sanded assembly may have internal variations but will present a substantially flat decorative veneer surface 320A. In effect, material has been removed from decorative veneer layer 320 to compensate for the variations in thickness originally present in the veneers. Accordingly, if the wide belt sanded veneer assembly 300 shown in FIG. 3B is mounted to a flat substrate surface, outside surface 320A of decorative veneer layer 320 will present a surface that is sufficiently flat and smooth for a high quality aircraft interior finish.

Figure 3C:
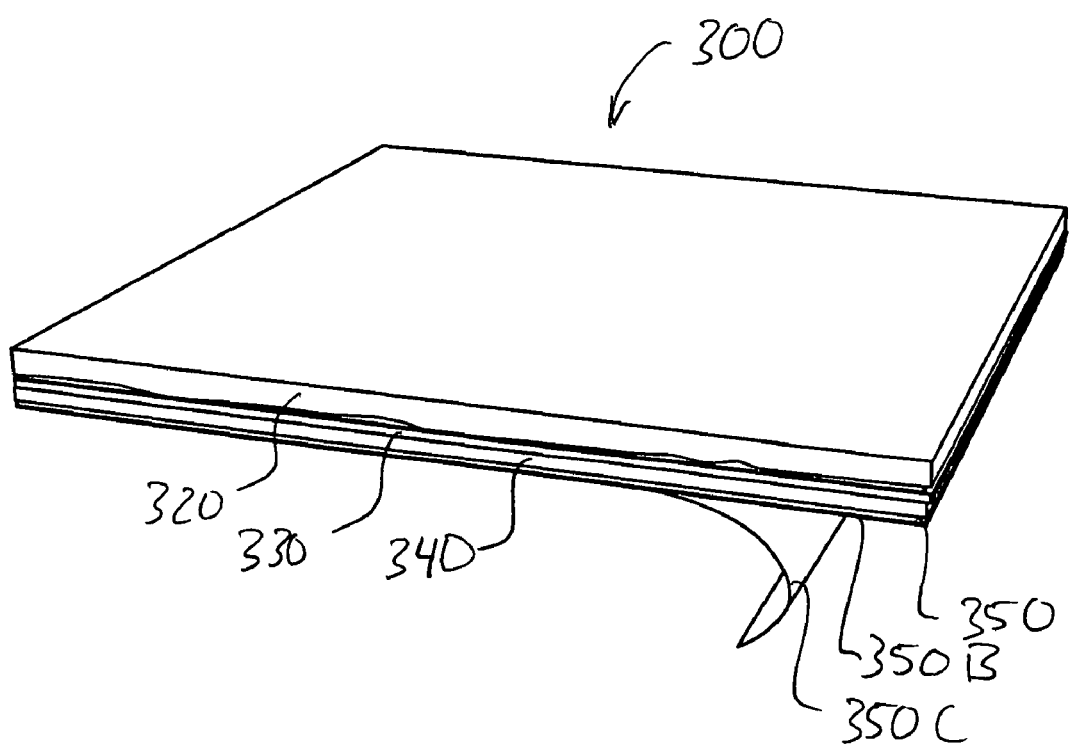
FIG. 3C is a cross-section diagram illustrating the third veneer assembly embodiment with an added layer of pressure sensitive adhesive including a release paper.

FIG. 3C shows veneer assembly 300. Aluminum layer 350 may include an optional layer of pressure sensitive adhesive (PSA) 350B. Typically, PSA includes a release paper (350C), which can be peeled away prior to placement on a substrate.

A second option for making veneer structure 300 is made possible by dividing the lay up into two steps, a first step which produces a laminate which presents an exposed layer of non-decorative veneer and a second step which covers that non-decorative veneer with a second layer of aluminum foil. Thus, to make the veneer structure 300 shown in FIG. 3 an additional pressing operation and a different sanding operation sequence are required. The veneer structure 300 shown in FIG. 3 may be considered as a double lay up which is first arranged and then pressed in two separate operations at elevated temperature to produce a bonded laminated structure. In the first pressing operation decorative veneer 320, phenolic adhesive 322, aluminum foil 330, phenolic adhesive 332 and non-decorative veneer 340 are bonded to make an assembly with non-decorative veneer 340 exposed. Thin film of adhesive 342 and the aluminum foil backing 330 will be added in a second pressing operation to the back of non-decorative veneer 340.

Thus the product of the first pressing operation described above is precision sanded by pressing outside surface 320A of decorative veneer 320 against a platen and precision sanding non-decorative veneer 340 to take out variations in the veneer layers. Then, the lay up shown in FIG. 3 including an additional thin film of adhesive 342 and an aluminum foil backing 350 is preferably pressed a second time at the pressures, temperatures and durations described above. To complete a wide belt sanded veneer assembly 300 as shown in FIG. 3B, outer surface 320A may be sanded to remove any residue from the manufacturing process and flatten the outer surface 320A of decorative veneer layer 320 in a wide belt sanding operation—but only very slightly in order to preserve as much of the thickness of decorative veneer layer 320 as possible. Thus the variations in thickness in veneer layers 320 and 340 are largely eliminated by removing material from decorative veneer layer 340 as shown in FIG. 3B. A completed, wide belt sanded veneer assembly 300 is shown in FIG. 3B. In FIG. 3B, the resulting sanded assembly may have internal variations but will present a substantially flat decorative veneer surface 320A. Close inspection of FIG. 3B reveals that the outside surface of decorative veneer layer 320, namely surface 320A is generally flat. FIG. 3C shows veneer assembly 300 with an extra layer of adhesive 350B. Aluminum layer 350 may include an optional layer of pressure sensitive adhesive (PSA) 350B. Typically, PSA includes a release paper 350C, which can be peeled away prior to placement on a substrate.

Figure 4:
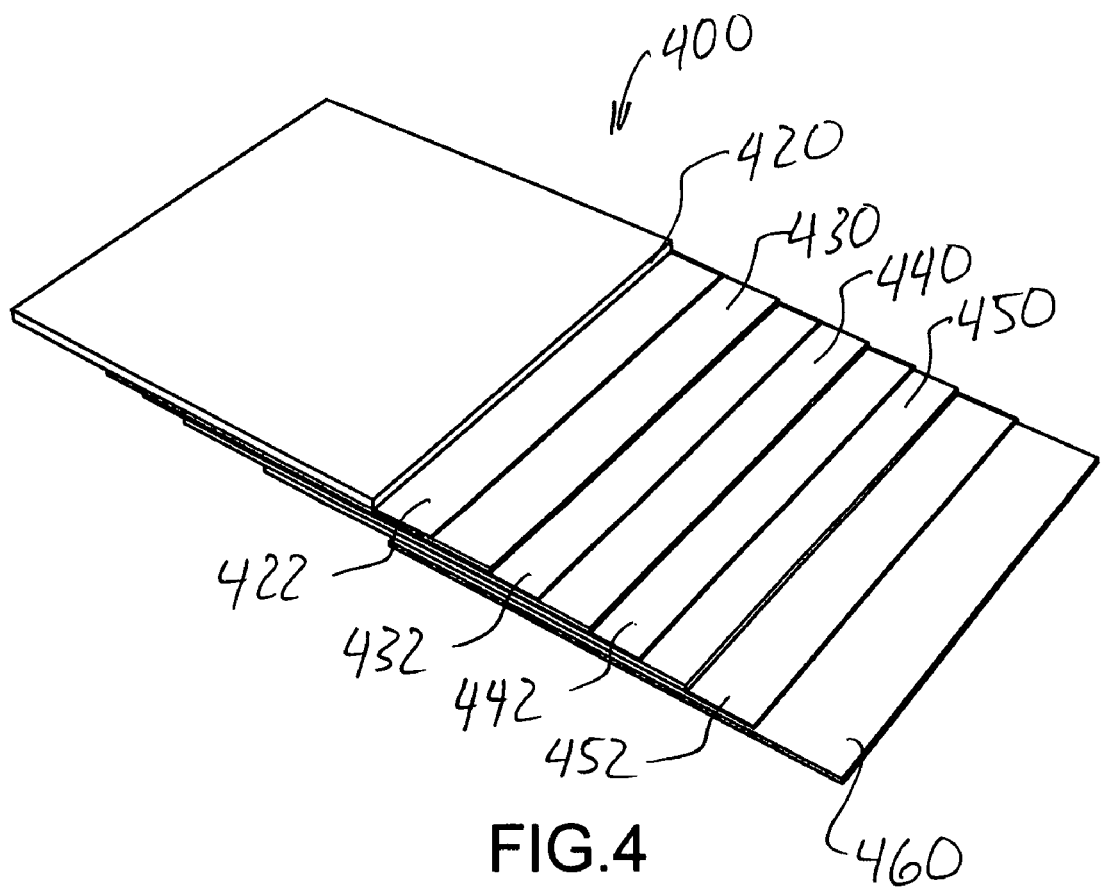
FIG. 4 is a perspective cross-section diagram illustrating a fourth veneer assembly embodiment.

Referring to FIG. 4, an example fire resistant 5-ply veneer assembly 400 for aircraft interiors is shown including a decorative wood veneer layer 420, an first aluminum foil layer 430, a first non-decorative veneer backing 440, a second aluminum foil layer 450 and a second non-decorative veneer backing 460. The veneer structure 400 shown in FIG. 4 may be considered as a lay up which is first arranged and then pressed at elevated temperature as described above to produce a bonded laminated structure. In FIG. 4, the edges of each layer are shown recessed within the underlying layer for ease of illustration. As can be seen in FIG. 4, thin films of phenolic adhesive 422, 432, 442 and 452 are interposed between decorative wood veneer layer 420 and first aluminum foil layer 430, between first aluminum foil layer 430 and first non-decorative wood veneer layer 440, between first non-decorative wood veneer layer 440 and second aluminum foil layer 450 and between second aluminum foil layer 450 and second non-decorative wood veneer layer 460. A noted above, phenolic adhesive is activated by high pressure and high temperature.

Figure 4A:
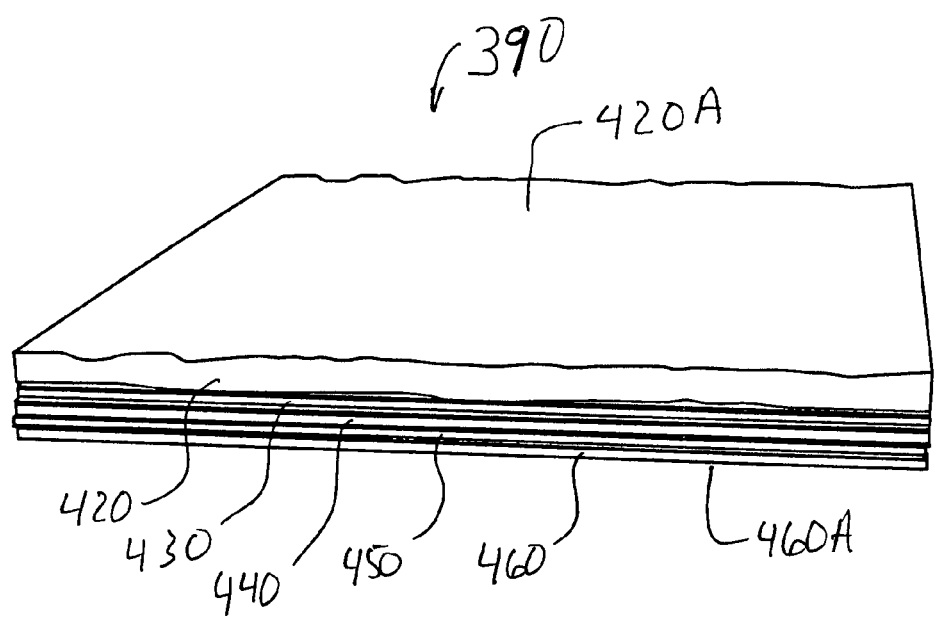
FIG. 4A is a cross-section diagram illustrating the fourth veneer assembly embodiment before wide belt sanding.

FIG. 4A illustrates veneer assembly 390, which indicates a veneer assembly, which is not completed. Veneer assembly 390 has not been processed through a wide belt sanding operation. As is shown in FIG. 4A, decorative veneer layer 420 of un-sanded veneer assembly 390 typically has residue from the manufacturing process and slight variations in thickness. The same is the case for first and second non-decorative veneer layers 440 and 460. In the precision wide belt sanding operation, outer surface 420A is pressed against a feed belt and platen while multi wide belt sanding heads removes material from outer surface 460A of non-decorative veneer layer 460. Thus the variations in thickness in veneer layers 420, 440 and 460 are largely eliminated by removing material from non-decorative veneer layer 460 as shown in FIG. 4B.

Figure 4B:
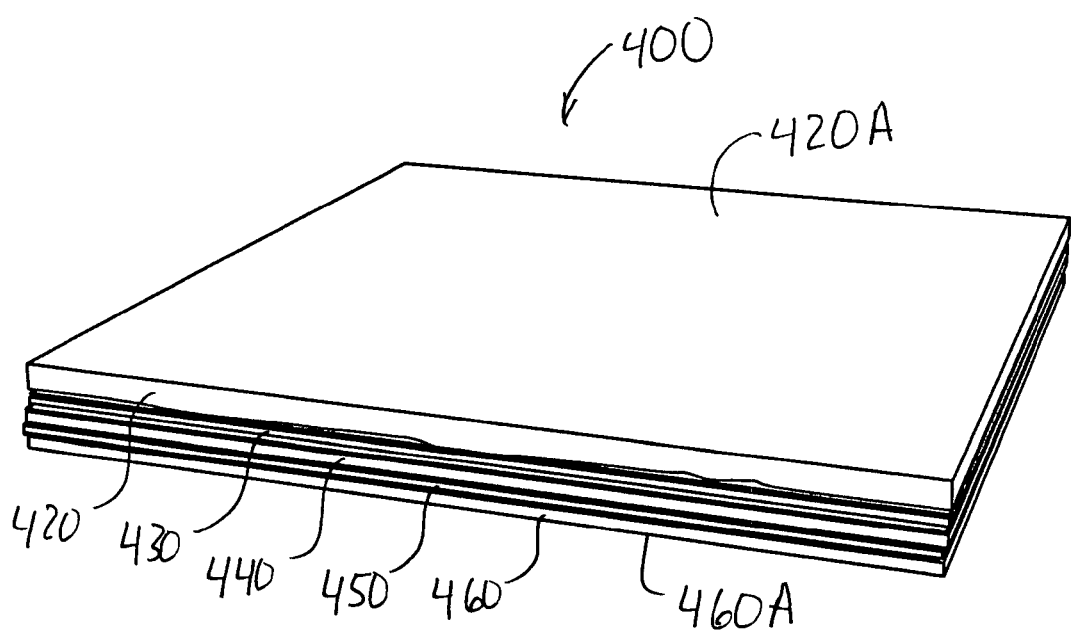
FIG. 4B is a cross-section diagram illustrating the fourth veneer assembly embodiment after wide belt sanding.
Figure 5:
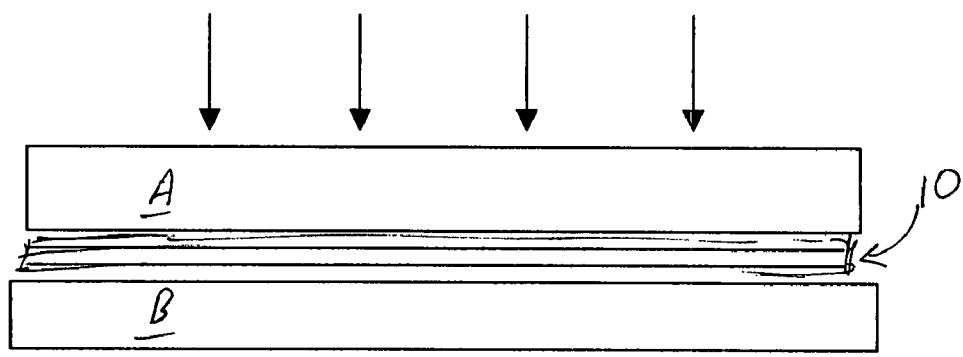
FIG. 5 is a diagram of a set up for pressing a veneer assembly under high pressure and temperature.

A completed, wide belt sanded veneer assembly 400 is shown in FIG. 4B. In FIG. 4B, decorative veneer surface 420A may also be sanded to remove any residue from the manufacturing process and flatten the outer surface 420A of decorative veneer layer 420 in a wide belt sanding operation—but only very slightly in order to preserve as much of the thickness of decorative veneer layer 420 as possible. In FIG. 4B, the resulting sanded assembly may have internal variations but will present a substantially flat decorative veneer surface 420A. Close inspection of FIG. 4B reveals that the outside surface of decorative veneer layer 420 namely surface 420A is generally flat. Further, in FIG. 4B, aluminum foil layers 430 and 450 now undulates in a way that corresponds to the initial variation of decorative veneer layer 20 shown in FIG. 4A. In FIG. 4B, first and second non-decorative veneer layers 440 and 460 vary in thickness and the outside surface 460A of second non-decorative veneer layer 460 is generally flat. In effect, material has been removed from second non-decorative veneer layer 460 to compensate for the variations in thickness originally present in the veneers. Accordingly, if the wide belt sanded veneer assembly 400 shown in FIG. 4B is mounted to a flat substrate surface, outside surface 420A of decorative veneer layer 420 will present a surface that is sufficiently flat and smooth for a high quality aircraft interior finish. Decorative veneer surface 420A may also be sanded in a wide belt sanding operation—but only very slightly in order to preserve as much of the thickness of decorative veneer layer 420 as possible.

FIG. 4C shows veneer assembly 400. Non-decorative veneer layer 460 may include an optional layer of pressure sensitive adhesive (PSA) 460B. Typically, PSA includes a release paper 460C, which can be peeled away prior to placement on a substrate surface.

Flame tests have shown that the resulting veneer assembly 10 (2-ply) is highly fire resistant. Tests have shown that the best results, in terms of flame resistance and minimum weight, are achieved if the thickness of the decorative veneer layer generally about 0.024 inches prior to sanding operations and if the thickness of the aluminum foil layer is between 0.002 inches and 0.006 inches with the most preferable thickness being about 0.003 to 0.005 inches. It should be noted that 0.024 or 1/42 inches is a standard thickness for wood veneers. FIG. 1C shows veneer assembly 10. Aluminum foil backing may include an optional layer of pressure sensitive adhesive (PSA) 30B. Typically, PSA includes a release paper 30C, which can be peeled away prior to placement on a substrate surface.

Flame tests have shown that the resulting veneer assembly 200 (3-ply) is highly fire resistant. Tests have shown that the best results, in terms of flame resistance and minimum weight, are achieved if the thickness of the decorative veneer layer generally about 0.024 inches prior to sanding operations and if the thickness of the aluminum foil layer is between 0.002 inches and 0.006 inches with the most preferable thickness being about 0.003 to 0.005 inches. It should be noted that 0.024 or 1/42 inches is a standard thickness for wood veneers. FIG. 2C shows veneer assembly 200. Non-decorative wood veneer backing may include an optional layer of pressure sensitive adhesive (PSA) 230B. Typically, PSA includes a release paper 230C, which can be peeled away prior to placement on a substrate surface.

Flame tests have shown that the resulting veneer assembly 300 (4-ply) is highly fire resistant. Tests have shown that the best results, in terms of flame resistance and minimum weight, are achieved if the thickness of the decorative veneer layer and non-decorative veneer layers generally about 0.024 inches prior to sanding operations and if the thickness of the aluminum foil layers are between 0.002 inches and 0.006 inches with the most preferable thickness being about 0.003 to 0.005 inches. It should be noted that 0.024 or 1/42 inches is a standard thickness for wood veneers. FIG. 3C shows veneer assembly 300. Aluminum foil layer may include an optional layer of pressure sensitive adhesive (PSA) 50B. Typically, PSA includes a release paper 350C, which can be peeled away prior to placement on a substrate surface.

Flame tests have shown that the resulting veneer assembly 400 is highly fire resistant. Tests have shown that the best results, in terms of flame resistance and minimum weight, are achieved if the thickness of the decorative veneer layer and non-decorative veneer layers are generally about 0.024 inches prior to sanding operations and if the thickness of the aluminum foil layer is between 0.002 inches and 0.006 inches with the most preferable thickness being about 0.003 to 0.005 inches. It should be noted that 0.024 or $\frac{1}{42}$ inches is a standard thickness for wood veneers. FIG. 4C shows veneer assembly 400. Non-decorative backing may include an optional layer of pressure sensitive adhesive (PSA) 460B. Typically, PSA includes a release paper 460C, which can be peeled away prior to placement on a substrate surface.

FIGS. 1 and 3 show fire resistant veneer assembly 100 and 300. Veneer assembly 300 includes a completed veneer assembly 200 and an additional aluminum foil layer 50. Some types of substrates for aircraft interior panels include nomex cores or other materials, which can be more easily bonded to aluminum. Accordingly, for some applications it is advantageous to have a veneer assembly, which further includes an aluminum foil backing. This additional layer of aluminum foil also further increases the flame resistance of the veneer assembly. Aluminum foil layer 50 may have a thickness ranging between 0.0005 inches and 0.006 inches. Preference will generally be given to the thinnest foil possible since each additional 0.001 inches in thickness of aluminum foil adds approximately 0.46 pounds to every standard 48 inch×96 inch sheet of finished veneer assembly. A weight of 0.46 pounds is deemed to be a significant amount of weight in the aircraft industry. If aluminum foil layer 50 is not added for additional flame resistance, then aluminum foil layer 50 need only be thick enough to provide a surface for bonding to some types of substrates.

As can be seen from the above description, veneer assemblies 100, 200, 300 and 400 provide light, strong, fire resistant veneer assemblies. Applicant's test of all of the above veneer assemblies have shown that these veneer assemblies are capable of passing very stringent flame tests mandated by the FAA.

It is to be understood that while certain forms of this invention have been illustrated and described, it is not limited thereto, except in so far as such limitations are included in the following claims and allowable equivalents thereof:

The invention claimed is:

1. A method for making a fire resistant wood veneer assembly, comprising the following steps;
   a) laying up a decorative wood veneer, an aluminum foil layer and a non-decorative wood veneer with a thin film of phenolic adhesive resin between the decorative wood veneer and the aluminum foil and a thin film of phenolic adhesive resin between the aluminum foil and the non-decorative wood veneer to make a lay up,
   b) pressing the lay up of step (a) at a pressure between 150 psi and 250 psi and at a temperature between 275 degrees F. and 325 degrees F. for four to six minutes,
   c) pressing the decorative wood veneer layer against a platen and belt sanding the non-decorative wood veneer layer disposed on the side of the aluminum immediately opposite the decorative veneer layer so that the resulting sanded lay up has a generally uniform thickness, and,
   d) adding a thin film of adhesive to the exposed surface of the non-decorative wood veneer layer, placing a second layer aluminum foil backing on the thin film of adhesive and pressing the resulting lay up according to the process set forth in step (b).

2. The method of claim 1 further comprising the step(s) of:
   covering the second layer of aluminum foil with a layer of pressure sensitive adhesive.

3. The method of claim 1, wherein;
   the layer of aluminum foil is fashioned from aluminum that has been heat treated to increase its yield strength.

4. The method of claim 1, wherein;
   the layer of aluminum foil has a thickness between 0.002 inches and 0.006 inches.

5. A method for making a fire resistant wood veneer assembly, comprising the following steps;
   a) laying up a decorative wood veneer, an aluminum foil layer and a non-decorative wood veneer with a first thin film of phenolic adhesive between the decorative wood veneer and the aluminum foil and a second thin film of phenolic adhesive between the aluminum foil and the non-decorative wood veneer to make a lay up,
   b) pressing the lay up of step (a) at a pressure between 150 psi and 250 psi and at a temperature between 275 degrees F. and 325 degrees F. for between four and six minutes,
   c) pressing the decorative veneer layer against a platen and belt sanding the opposite non-decorative wood veneer layer so that the resulting sanded lay up has a generally uniform thickness,
   d) adding a third thin film of adhesive to the exposed surface of the non-decorative wood veneer layer,
   e) placing an aluminum foil backing on the thin film of adhesive and pressing the resulting lay up according to the process set forth in step (b).

6. The method of claim 5, wherein;
   at least the first layer of aluminum foil is fashioned from heat treated aluminum.

7. The method of claim 5, wherein;
   each layer of aluminum foil has a thickness between 0.002 inches and 0.006 inches.

8. The method of claim 5, wherein;
   the exposed surface of the aluminum foil backing is covered with a layer of pressure sensitive adhesive.

9. The method of claim 5, wherein;
   at least the first layer of aluminum foil is fashioned from heat treated aluminum, and,
   each layer of aluminum foil has a thickness between 0.002 inches and 0.006 inches.

10. The method of claim 5, wherein;
    at least the first layer of aluminum foil is fashioned from heat treated aluminum,
    each layer of aluminum foil has a thickness between 0.002 inches and 0.006 inches, and,
    the exposed surface of the aluminum foil backing is covered with a layer of pressure sensitive adhesive.

* * * * *